July 3, 1962  A. T. BIEHL  3,042,599
LOW POWER NUCLEAR REACTORS
Filed Nov. 26, 1956  5 Sheets-Sheet 3
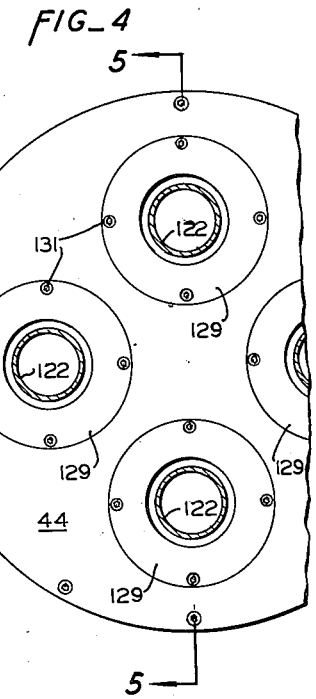
FIG_4
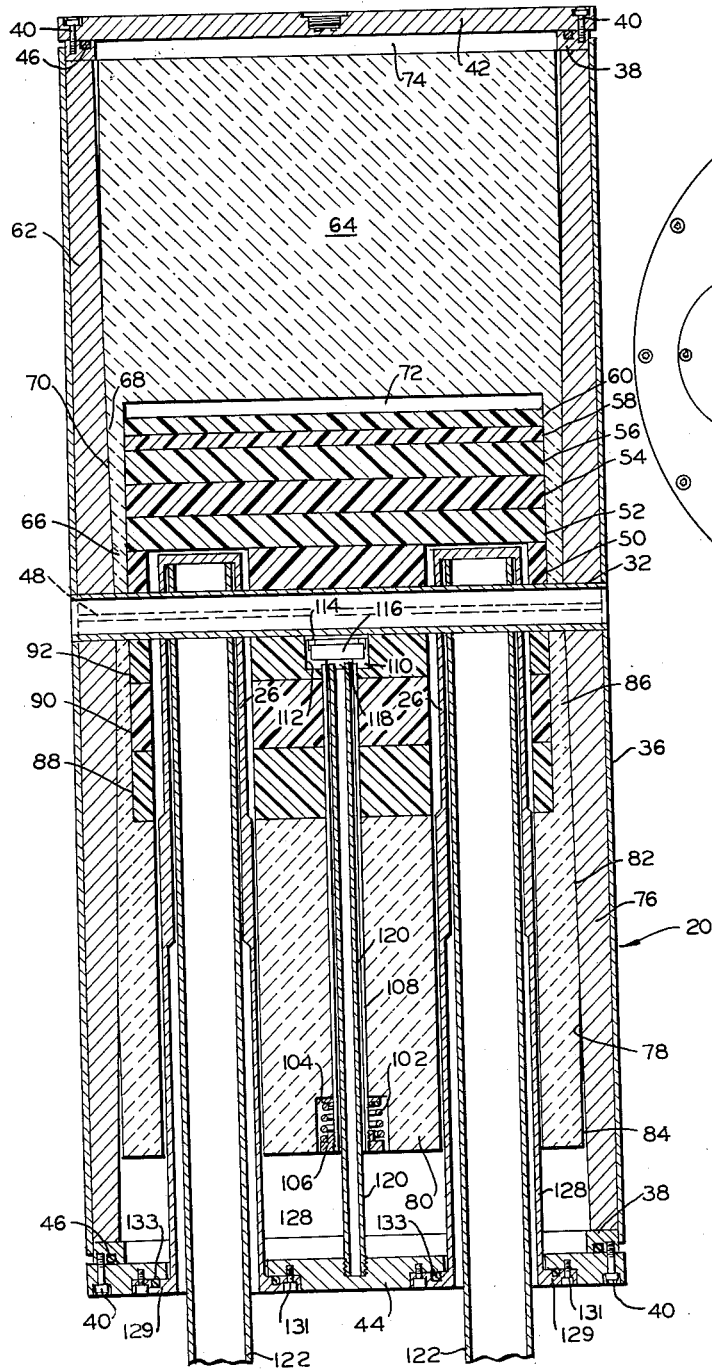
FIG_5
INVENTOR.
ARTHUR T. BIEHL
BY Naylor & Neal
ATTORNEYS July 3, 1962 A. T. BIEHL 3,042,599
LOW POWER NUCLEAR REACTORS
Filed Nov. 26, 1956 5 Sheets-Sheet 4
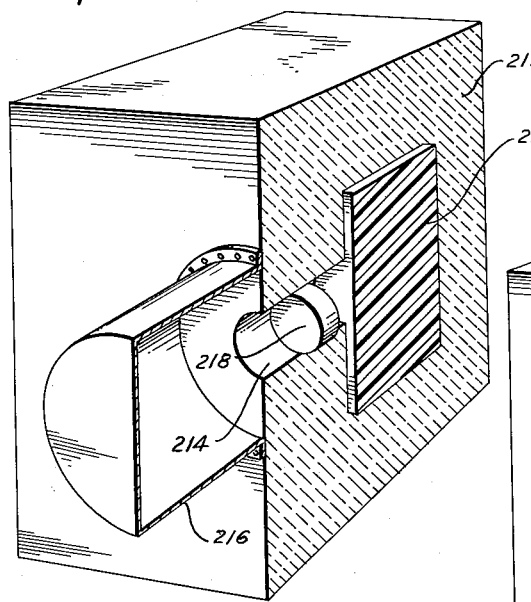
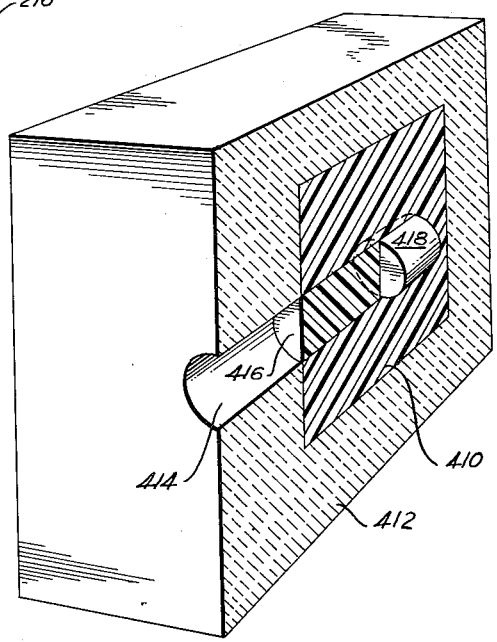
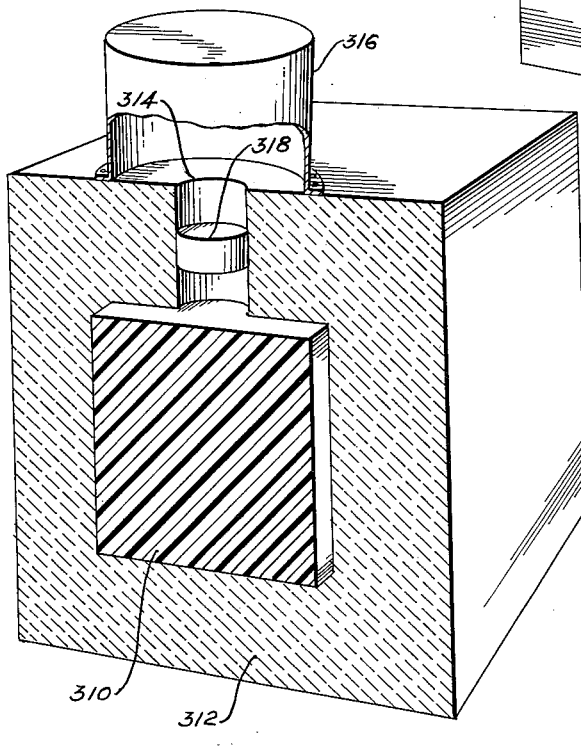
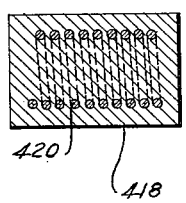
INVENTOR.
ARTHUR T. BIEHL
BY
Naylor & Neal
ATTORNEYS July 3, 1962
A. T. BIEHL
3,042,599
LOW POWER NUCLEAR REACTORS
Filed Nov. 26, 1956
5 Sheets-Sheet 5
FIG_10
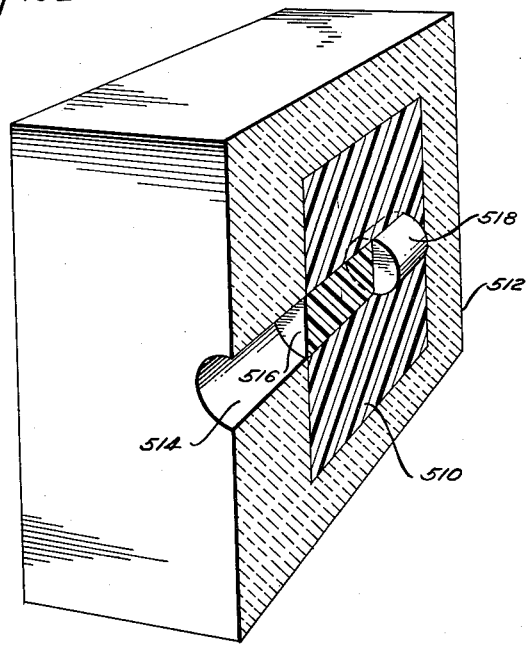
FIG_11
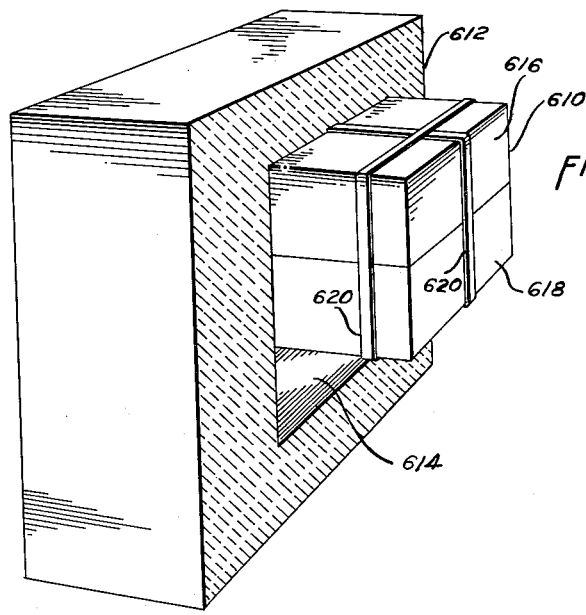
INVENTOR.
ARTHUR T. BIEHL
BY
*Naylor & Neal*
ATTORNEYS United States Patent Office 3,042,599
Patented July 3, 1962

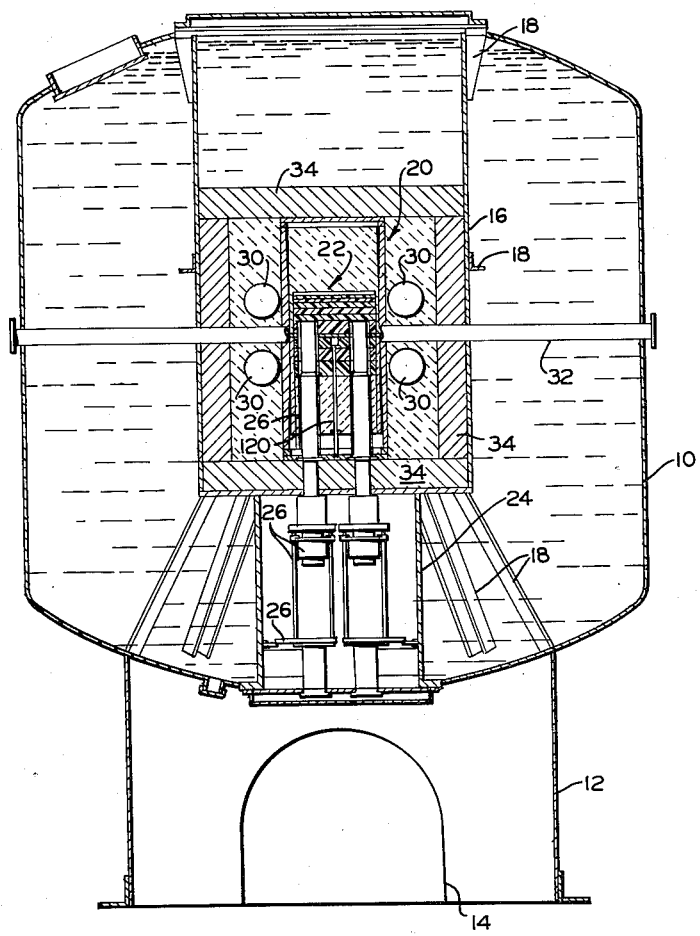

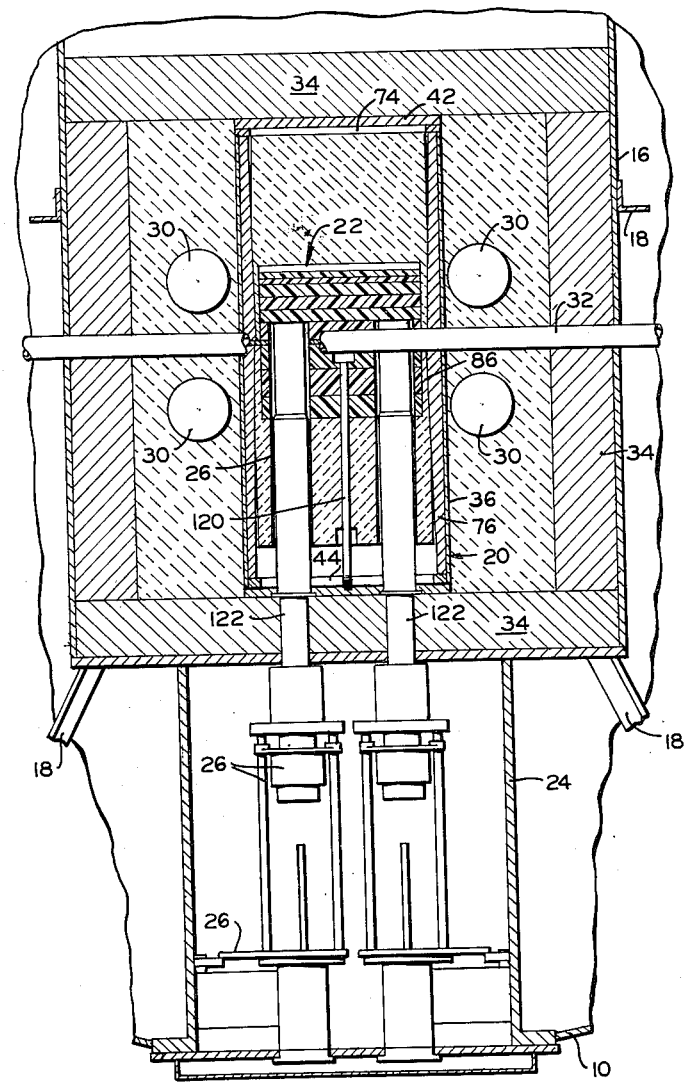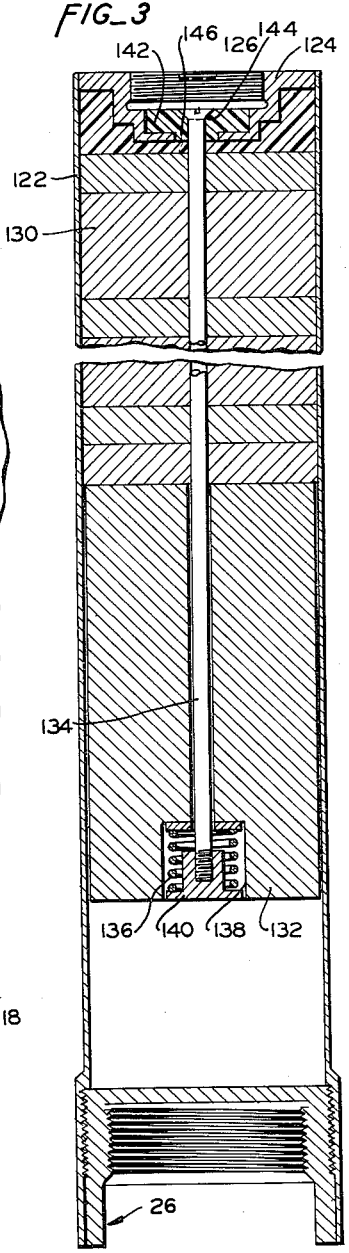

3,042,599
LOW POWER NUCLEAR REACTORS
Arthur T. Biehl, Danville, Calif., assignor, by mesne assignments, to the United States of America as represented by the United States Atomic Energy Commission
Filed Nov. 26, 1956, Ser. No. 624,295
14 Claims. (Cl. 204—193.2)

The subject inventions relate to the use of atomic energy; more particularly they relate to nuclear reactors; and specifically they relate to improvements adapted for use in low power nuclear reactors, i.e. those adapted to operate at a power level of one kilowatt and less, whereby a solid multiple section core of fuel impregnated resinous material, such as polyethylene, is protected against deformation or melting under the effect of temperature increase caused by an excursion, or accidental runaway, of the reactor, and the core is abruptly caused to separate, in response to a sudden undesirable increase in temperature, into spaced apart sections of less than a critical mass.

The general purpose subserved by the subject inventions is the provision of a fail safe, low power, self contained, nuclear reactor adapted for use in the fields of education, research, medical diagnosis and industrial process control, as distinguished from the fields of intense radiation damage study, fission products supply, and high magnitude of radiation service. Such a low power reactor can, at a comparatively insignificant cost relative ot the cost of high power reactors, be a particularly useful instrument in connection with such as the following: the training of students in nuclear engineering course work; on-site production of short lived isotopes of high specific activity for medical use and tracer study; activation analysis in such fields as metallurgy, chemistry, agriculture, and medicine; industrial process control; and reactor component testing using danger coefficient and pile oscillator techniques.

It is recognized that low power reactors have been built using hydrogenous materials as the moderator; however, to my knowledge, previously proposed reactors of this type have not embodied the following, the provision of each of which may be considered to be among the objects of my invention: a core manufactured by impregnating a resinous moderating material such as polyethylene with a fissionable material such as uranium oxide enriched with U 235, the core having a fusion point sufficiently high to prevent melting or other damage to the core during an excursion; a multi-section core, the sections of which are normally retained together for reactor operation; means responsive to excursion conditions to cause the core sections to be abruptly separated so as to stop the reaction; and means comprising reflector and shielding materials adapted to confine the fission products within the core or at least to confine them within the reactor during both normal operation and excursion conditions.

Other objects and advantages of the invention will be apparent from the following description taken in conjunction with the drawings forming part of this specification, and in which:

FIGURE 1 is a vertical diametral showing of a low power reactor embodying the subject invention;

FIGURE 2 is an enlarged view of the central position of the reactor shown in FIGURE 1;

FIGURE 3 is an enlarged view in vertical diametral section showing the fuse system embodied in the control and safety rod elements of the reactor;

FIGURE 4 is a bottom plan view of the core tank section of the reactor;

FIGURE 5 is a view in section taken along lines 5—5 of FIGURE 4;

FIGURES 6, 7, 8, 10 and 11 are cutaway views in perspective of modifications of fail safe core and reflector assemblies; and FIGURE 9 is a vertical diametral view in section of the temperature responsive core separator device of the embodiment of FIGURE 8.

With reference to FIGURE 1 for a brief overall description of the reactor, the reactor comprises an outer fluid tight tank 10 secured to tank support 12 having access cover 14, an intermediate tank 16 secured within and to tank 10 by support means 18, an inner core tank 20 containing a core indicated generally at 22, housing means 24 for control means 26 adapted to move the active upper ends of four safety and control rods into and out of core 22, a plurality of tube defined passageways 30 constituting access ports extending transversely through the reactor, and a tube 32 extending diametrally through the reactor, including the core 22 thereof, constituting what is termed the glory hole of the reactor.

The outer tank 10 is filled with water containing boric acid to constitute the fast neutron shield of the reactor. The core tank 20 is surrounded with lead shielding 34 which is supported within intermediate tank 16. The upper part of intermediate tank 16, constituting the thermal column of the reactor, may be likewise filled with a water-boric acid shield.

With reference now to FIGURES 4 and 5 for a detailed description of the core tank assembly, it will be seen that the tank comprises a cylindrical side wall 36 having secured within the ends thereof annular ring members to which there are secured, as by bolts 40, upper and lower end plates 42 and 44. Sealing rings 46 are provided within grooves formed in rings 38 to provide a fluid tight seal between said rings and the upper and lower plates 42 and 44. Extending from opposite sides of tube 32 and secured to the tube and to the side wall 36 of the tank is horizontally disposed partition plate 48 which, in effect, divides the tank into upper and lower compartments, said plate being provided with appropriate openings to accommodate the upper ends of the safety end control rods.

Supported by plate 48 thereabove is a plurality of cylindrically shaped fuel discs 50, 52, 54, 56, 58 and 60. Disposed within the upper compartment of the tank is an annular reflector member 62 and a cylindrical reflector member 64 having an annular depending portion 66 which rests on plate 48 and laterally encloses the fuel discs 50-60. The reflectors 62 and 64 are formed of high density graphite. It is to be noted that the inner wall of the reflector member 62 is tapered so that it diverges outwardly in an upward direction, said tapered wall being designated by reference numeral 68, and that the lower side wall portion 70 of the reflector member 64 is complementally tapered so as to converge inwardly in a downward direction. Head spaces 72 and 74 are provided, respectively, between the uppermost fuel disc 60 and reflector member 64 and between reflector member 64 and the top tank plate 42 for purposes hereinafter described.

The lowermost compartment of the tank is occupied by an annular graphite reflector member 76 which is supported on the bottom ring 38 and which is provided with an inner wall 78 which tapers outwardly in a downward direction. Fitted within reflector member 76 and disposed in abutting relation with plate 48 is a substantially cylindrical inner graphite reflector member 80 which is provided with an upper outer wall portion 82, having a taper complemental to that of wall 78 of reflector member 76, and with a lower cylindrical wall portion 84. Nested within the upper annular portion 86 of reflector member 80 and supported by said reflector member is a plurality of fuel discs 88, 90 and 92. The reflector member 80, fuel discs 88–92, partition plate 48, and fuel disc 50 are suitably apertured to receive the upper ends of the safety and control rods hereinafter described.

Reflector member 80 is supported in the position shown in FIGURE 5, in which position fuel discs 88–92 are operationally associated with fuel discs 50–60, by compression spring 102 which is disposed within a well 104 formed in member 80 and which is supported by a flange nut 106. Nut 106 is in turn threadably engaged with the lower end of tube 108. Tube 108 extends upwardly through cylindrical passageways formed in reflector member 80 and fuel discs 88–92 and has its upper end secured to an annular cup-shaped member 110 which is seated within recess 112 formed in fuel disc 92. Threadably engaged with the upper end of cup-shaped member 110 is a ring member 114 which overlies the marginal edge of the upper side of a disc-shaped fuse member 116 which is fitted within cup-shaped member 110. Fuse member 116 is centrally supported at its underside by button 118 which is fixedly secured to the upper end of tubular support member 120, the latter being disposed concentrically of tube member 108 and having its lower end threadably engaged with the bottom tank plate 44.

It will thus be seen that the reflector member 80 and the fuel discs 88–92 are spring-pressed into position for reactor operation and that the weight of the reflector member and the fuel discs 88–92 is transmitted by ring member 114 to fuse member 116 as a compressive shear force applied to the latter. Thus, if the fuse member 116 is caused to melt or to lose its ability to serve as a positive link in the chain of support for the reflector and fuel disc members disposed in the lower compartment of the core tank, the entire lower compartment assembly consisting of reflector member 80, fuel discs 88–92, spring 102, nut 106, tube 108, cup-shaped member 110, and ring member 114 will gravitate downwardly within the lower tank chamber until the reflector member 80 strikes tank plate 44, and such movement of this lower compartment assembly will be accelerated by spring 102.

It will be appreciated that the fuse member 116, the specific characteristics of which will be hereinafter described in detail, is adapted to melt practically immediately upon an increase over its normal operating temperature which is indicative of a reactor excursion. When the lower tank assembly falls away, the critical mass of the core becomes non-critical and the fission reaction terminates. To insure that the lower tank assembly is caused to positively fall away to terminate the excursion condition, a graphite-to-graphite contact constituted by the inner surface of fixed reflector member 76 and the outer surface of reflector member 80 is provided between the fixed and movable lower tank sub-assemblies, and the tapering offset relation between surface 78 of fixed reflector member 76 and a surface portion 84 of movable reflector member 80 is provided so that the movable assembly will not bind or jam against downward movement.

The reactor core consists essentially of the fuel dispersed in a hydrogenous resinous material.

The fuel can be any of the thermally fissionable uranic and transuranic elements such as U 235, U 233, and plutonium, as well as mixtures thereof. The preferred fuel for reasons of cost and availability is U 235. The fuel can be provided in the form of the pure metal, the oxides or either inorganic or organic salts thereof. Examples of these are $UO_2$, $UO_3$, uranium oxide hydrates, uranyl nitrate, uranyl sulfate, uranyl acetate and uranium disulfide, as well as mixtures thereof. $UO_2$ and $UO_3$ are preferred for reasons of cost, availability and stability.

The hydrogenous moderating material in which the fuel is dispersed is a solid polymer having a relatively high hydrogen density and being capable of withstanding the temperatures achieved by the core during both normal operation and during an excursion.

High molecular weight paraffin polymers, and in particular, polyethylene and polypropylene polymers are preferred in the practice of my invention. Other polymers such as the typical rubber polymers, for example, butyl rubber, can also be used. All of these materials have very high hydrogen densities. High molecular weight linear polyesters, polyurethanes, polysulfide polymers and even silicone polymers can be used, but, however, due to their lower hydrogen densities, these materials are less desirable than the paraffins. The preferred polymers are those having a hydrogen density above about $5 \times 10^{22}$ hydrogen atoms/cc.

The core material consists of about 2.5–7.5% by weight of fuel (U 235, U 233, etc.), with the balance by weight consisting substantially of the solid polymer moderator.

The polymer which is to be used must be thermally stable at the temperatures achieved during normal operation of the reactor and also at the temperatures reached during an excursion. In the case of the low power reactor more particularly described herein (100 mw.) the core temperature under normal operating conditions is approximately room temperature. In the event of an excursion, the temperature will be expected to rise up to 100° C. before the activity of the core can be reduced to zero, the exact temperature depending upon the excess reactivity introduced.

However, it is preferred to use a polymer which is thermally stable at temperatures at least as high as about 100° C. to avoid any possibility of damage to the core material and resultant loss of fission products.

The following is a detailed description of the preparation of the preferred core material according to my invention which is comprised of a plurality of discs formed from a homogeneous mixture of enriched $UO_2$ dispersed in polyethylene. The $UO_2$ particles preferably have a diameter of from about 10 to 30 microns and contain about 20% by weight of U 235.

For reasons of convenience, the preferred configuration of the core is that of a cylinder, however, virtually any other configuration can be used, for example, cubes, cones, spheres, oval, hour-glass and pear-shaped, as well as irregular solid configurations.

In practice the critical mass of the reactor is about 600 grams of U 235. The total density of $UO_2$ is approximately 284 milligrams per cubic centimeter of core, and this gives a weight ratio of 1 gram of $UO_2$ to 3.16 grams of polyethylene.

Prior to use in the reactor, the core discs are irradiated from both sides to effect a small amount of crosslinking of the polyethylene polymers, thereby raising the melting point of the core moderator and protecting the core against melting or deformation in the event of a reactor excursion. Such irradiation may be conveniently done by applying to the discs 6 mev. electrons from an electron linear accelerator to an exposure of about 3 megarep. Alternately, the polyethylene powder may be irradiated before the discs are formed, but this is a less satisfactory procedure.

It will be appreciated that other radiation sources, for example, a cobalt 60 source, can be used. In addition, if the irradiation of the powder in the pre-irradiation technique is conducted in the absence of oxygen, as for example in a nitrogen atmosphere or under a vacuum, a lower amount of exposure will produce the same result.

In the case of other polymers such as polypropylene, irradiation is not necessarily required to achieve the desired result. Heat and high pressure can be used to effect polymerization depending upon the monomers employed and the properties desired. The preparation of polymers is well understood and documented in the polymer art and hence further descriptions of these conventional techniques is considered unnecessary.

It should be understood that the stability of monomers in the presence of radiation can be improved by the addithe enlarged head 144 of a rod 134 to drop therethrough.

All of the structural parts of the reactor save the tank assembly, are formed from commercial aluminum or aluminum alloy.

The preferred reflector material in the practice of my invention is graphite; however, any conventional reflector material can be used. Other commonly used reflector materials are, for example, beryllium oxide, paraffins, water, lead, hydrogenous resins, and the like. The reflector is in actuality a second non-absorbing medium placed around the core material, which by diffusion scatters some of the neutrons which enter into it back into the core material, thereby raising the neutron density in the core. It will be appreciated that the reflector can be virtually any substance having a low capture cross section including the original moderating medium.

The shielding material is provided purely for protective reasons to avoid exposing personnel working with and about the reactor to harmful radiation. In general, any material sufficiently opaque to radiation can be used. Concrete, deuterium oxide, water, especially aqueous solutions of boron salts, paraffins, waxes and petroleum hydrocarbons are commonly used for neutron shielding purposes. Shielding is effected simply by the quantity of shielding material employed through which the neutrons must travel in order to escape. The shielding preferably has a thickness of about 50 cm. Gamma radiation is stopped by a layer of lead shielding. Other conventional materials relatively opaque to gamma radiation can be used if desired.

The operation of a reactor for the continuous production of radioactive material requires that there be present a critical mass of fissionable materials. A critical mass is obtained when the rate of production of neutrons is equal to the rate of loss both by leakage and non-productive capture; at this point the reaction becomes critical or self-sustaining. Thus, the achievement of a critical mass is primarily dependent upon the amount of fissionable material present, the parasitic capture the means provided to prevent the escape of neutrons from the core material. The moderating material of the core proper, in this case the hydrogenous moderating material, keeps a large proportion of the neutrons within the core by slowing down the fission neutrons to thermal energies. The concentration of hydrogen atoms thus bears a direct relationship to the amount of enriched material required to achieve critical mass. Similarly, the reflector material increases the neutron concentration of the core by reflecting the neutrons leaking out of the core back into the core where they may collide with fissionable atoms to produce more neutrons. The geometry of the core also contributes to this effect by increasing or decreasing the average distance which a neutron must travel in order to escape from the core, thereby increasing or decreasing the number of neutrons which actually do escape. From this it will be appreciated that the total amount of fissionable material required to achieve critical mass varies depending upon the concentrations used, the nature of the diffusion material, especially the hydrogen density, the geometry of the core and the composition and position of the reflector material. Very small excesses of fissionable material in the present reactor are permissible provided they are not so high as to render the reaction uncontrollable. At concentrations below the critical mass, the reaction is not self-sustaining and the desired neutron flux will not be obtainable.

The required amount of fissionable material to achieve the critical mass in any given situation can be determined with a reasonable amount of certainty by calculation in the conventional manner. This method is disclosed in detail in Glasstone and Edlund, The Elements of Nuclear Reactor Theory.

The problem of determining the critical mass in the present invention is substantially reduced by the use of a core material composed of a plurality of segments which allow finite and precise alterations of the amount of fissionable material present in the core so as to achieve optimum results.

FIGURES 6–11 show in a somewhat schematic manner a plurality of core assemblies adapted to be abruptly brought to a non-reacting condition in response to a temperature increase caused by an excursion condition.

In FIGURE 6, the core 210 is enclosed within reflector 212. Reflector 212 is provided with a cylindrical passageway 214 which provides for communication between core 210 and the inside of cylindrical container 216, the latter containing pressurized boron fluoride. Communication between core 210 and container 216 is normally prevented by uranium-loaded fuse 218 which may be formed of a low melting point alloy such as Woods metal (bismuth-tin). Upon the occurrence of an excursion condition, the fuse 218 is melted, thus allowing the boron fluoride poison to be released through passageway 214 to contact core 210. The core reaction is thereby abruptly halted.

In FIGURE 7, core 310 is disposed within reflector 312 having a cylindrical passageway 314 providing for communication between container 316 and the core. The container 316 contains boric acid. Communication between container 316 and the core is prevented by fuse plug 318 which may be formed of uranium-loaded polystyrene. Upon the occurrence of an excursion condition, fuse 318 melts, releasing boric acid poison through passageway 314 into contact with the core 310, thereby causing activity of the core to be abruptly stopped.

In FIGURE 8, the core 410 is disposed within reflector 412 having a cylindrical passageway 414. Disposed within a cylindrical passageway formed in the core 410 in alignment with passageway 414 is a core plug 416 and a fuse 418. Fuse 418 is comprised of uranium-loaded lead-bismuth which contains a spring 420 maintained under compression. Upon the occurrence of an excursion condition, the lead-bismuth melts, thereby releasing spring 420 which drives core plug 416 out of the core through passageway 414. The core activity is thus abruptly stopped.

In FIGURE 10, core 510 is disposed within reflector 512 having a cylindrical passageway 514. Disposed within a cylindrical passageway formed within the core 510 is a core plug 516 and a fuse 518. Fuse 518 is formed of uranium-loaded ignitible explosive material. When an excursion occurs, fuse 518 explodes and drives core plug 516 out of the core through passageway 514, thereby stopping the excursion.

In FIGURE 11, core 610 is disposed within reflector 612 having an oversize core chamber 614. The core 610 is formed of an upper section 616 and a lower section 618. Core section 616 is held at the top of chamber 614 by means, not shown, and the lower core section 618 is secured to upper section 616 by uranium-loaded plastic tapes 620. When an excursion occurs, tapes 620 are abruptly melted, thereby allowing the lower core section 618 to drop away from upper core section 616. When this occurs, the excursion is halted.

The control system, not shown, for the reactor is to be understood as being very similar to that which has been previously employed for other low power research reactors.

What is claimed is:

1. A low power nuclear reactor core formed of a homogeneous mixture of polyethylene and U 235 enriched $UO_2$ particles having a diameter of 10–30 microns, said polyethylene being pre-irradiated to about 3 megarep.

2. A nuclear reactor core adapted for use in reactors having a power rating of 1 kilowatt and less, said core being cylindrical in form and comprised of a plurality of superposed discs of varying thicknesses, said discs being formed of a homogeneous mixture of polyethylene and U 235 enriched $UO_2$ particles having a diameter of 10–30 tion of certain substances such as allyl thiourea, aniline, benzoquinone, and 8-hydroxyquinoline in the conventional manner without departing from the scope of my invention.

The pre-irradiation of the core in the case of the polyethylene moderator serves two important purposes. First, it insures that, from the very outset of operation of the reactor, the core will not melt during the course of a power excursion. In practice, it is anticipated that the subject reactor core will be heated up to a temperature increment of 67° C. during an excursion before the activity of the core can be decreased to zero, and that the core will be heated to an average temperature of about 150° C. during an excursion. The pre-irradiated core, however, may be heated to a temperature in excess of 300° C. without melting. At such a temperature, the core tends to char. A second important consideration as to the pre-irradiation of the core is that the insured solid form thereof during an excursion will minimize any escape therefrom of the radioactive fission products produced therein.

The core, therefore, serves as the first sealing means, or container, for the fission products produced. The core tank 20 serves as the second sealing means, or container, for any fission products that could possibly be released from the core as well as for any gas that might be liberated by ionization of the polyethylene moderator during a nuclear excursion. The free head space 72 between the core and the upper reflector member 64 is provided to enable expansion of the core during an excursion and as a space for accumulation of any gas that might be released from the core. The tanks 16 and 10 serve as further sealing means, or containers, against escape from the reactor of any gaseous products.

The 10–30 micron diameter size of the $UO_2$ particles in the core permits the heat formed during a power excursion to diffuse out of the $UO_2$ particles and into the polyethylene moderator in less than 1 millisecond. Thus, the $UO_2$-polyethylene mixture may be considered as being homogeneous as far as such a power excursion is concerned.

The fuse 116 is formed of a material similar to that used in the core; however, in the case of the fuse, a polymer having a relatively low melting point is required. The melting point of the fuse should be on the order of about 35° C. above the normal operating temperature of the reactor so that in the event of an excursion the fuse will melt, allowing the core members to separate thereby shutting down the reactor. The selected melting point of the fuse is purely arbitrary and is chosen in view of the normal operating temperature of the reactor, excursion temperatures and the melting point of the core. Obviously, in order to function properly, the fuse must melt at a temperature above the normal operating temperature of the reactor and below the temperature that may be expected in the fuse in the advent of a nuclear excursion.

A wide variety of polymers, depending upon the temperature requirements involved, are available for this purpose. In general, the polymer useful for the fuse must not be subjected to any appreciable amount of radiation degradation, preferably should not creep, and must have a melting point above the normal operating temperature of the reactor. Depending upon the temperature requirements in a given situation, some of the materials previously described as being useful for the production of the core can be used in the fuse. The rate at which the fuse is heated in the event of an excursion can be increased by increasing the loading density of the enriched material.

The preferred fuse for the 100 mw. low power reactor, more particularly described herein, is formed of polystyrene which is likewise homogeneously impregnated with $UO_2$ particles, but which has twice the loading density of $UO_2$ particles compared to that of the core proper. The polystyrene fuse does not readily polymerize under the influence of fission product radiation, and hence its melting point is not raised by such radiation. The two-fold density of fuel in the fuse compared to that of the core causes the fuse to rise in temperature approximately twice as rapidly as does the core during an excursion. When the fuse reaches a temperature of approximately 100° C., it melts, and the core separates completely in the manner previously described to shut down the reactor. It is to be pointed out that the polystyrene fuse 116 is stressed substantially completely in compression and shear in order to eliminate any possible creeping of the polystyrene under tension conditions.

It will be appreciated that the fuse safety system is provided as an auxiliary safeguard against the possibility that the electronic control system for the reactor fails to sense an excursion condition and thereby drive the safety and control rods outwardly of the core to bring the core to a sub-critical condition, or against the possibility that the safety and control rods may fail to so operate. A further safeguard is provided against such a calamity condition as overturning of the reactor and failure of both the electronic control safety system and the fuse safety system. In such an event, if the core happens to be inverted, or substantially so, the reflector member 64 and the fuel discs 50–60 may fall away from the partition plate 48 into the head space 74, thereby causing the core to become sub-critical in mass. To facilitate such movement, the interjacent surfaces of the fixed reflector member 62 and the movable reflector member 64 are provided with the same tapering relationship as previously described in connection with the lower compartment reflector members 76 and 80.

As previously related, the reactor has two safety rods and two control rods, one of the latter being the coarse control rod and the other being fine control rod. The two safety rods and one coarse control rod are active, i.e. contain U 235 and identical, and these are exemplified in FIGURE 3. The fine control rod, not shown, is also active and is smaller in diameter than the two safety rods and the coarse control rod. With reference to FIGURE 3, each of the active rods comprises a tube 122 having its upper end fluid sealed by means of an end cup 124 having removably associated therewith a plug member 126 and provided at its lower end with a fluid seal connection with the rod movement controlling means generally indicated at 26. Each tube 122 in turn is movably disposed within an outer tube 128 which has a closed upper end and a lower end joined to a ring 129 in a fluid tight manner. Each ring 129 is secured, as by bolts 131, within a counterbore formed in tank plate 44. Sealing rings 133 provide a fluid-tight seal between rings 129 and plate 44. The provision of two tubes 122 and 128 for each of the active rods constitutes a double seal against escape of fission products from either the core or the rod.

Within each tube 122 there is disposed a plurality of fuel discs 130 which are formed and pre-irradiated in the manner previously described for the larger fuel discs of the core. Disposed beneath the fuel discs 130 is a cylindrical graphite reflector member 132. The fuel discs 130 and reflector member 132 are strung on a rod 134 and are supported thereon by means comprising: compression spring 136 disposed within recess 138 formed in reflector member 132; flange nut 140 threadably secured to rod 134; and a polystyrene fuse disc 142 supported by end cup 124 and disposed in supporting relation to an enlarged head 144 formed on rod 134. Fuse disc 142 is provided with twice the fuel loading density of discs 130.

The arrangement of the two safety rods and the coarse control rod is therefore such that, in the event of a nuclear excursion and failure of the scram control mechanism to withdraw the tubes 122 from the core, the fuse discs 142 quickly melt and the fuel and reflector assemblies within the tubes 122 drop downwardly therein to reduce the core to a sub-critical mass. Aperture 146 formed in the lower end of each end cup 124 permits microns, said polyethylene being pre-irradiated to about 3 megarep.

3. The core of claim 2, said core being disposed concentrically within a fluid tight core tank having a cylindrical side wall and removable end plates, annular graphite reflector means disposed intermediate said core and said tank, and a pair of substantially cylindrical reflector members disposed within said tank, one of said members being disposed above said core and the other of said members being disposed beneath said core, said members having a sliding fit with said annular reflector means.

4. A core assembly for a low power nuclear reactor comprising a fluid tight core tank, a horizontally extending thin partition member disposed therein dividing said tank into upper and lower chambers, a solid form hydrogen moderated $UO_2$ core disposed in said tank, said core having a first sub-critical mass portion disposed above said partition member and supported thereby and having a second sub-critical mass portion disposed beneath said partition member, means supported by said tank and disposed within said lower chamber operable to hold said second core portion against said partition member in reactive relation with said first core portion, said means including a heat responsive member disposed within said core operable in response to a predetermined increase in temperature of said core to release said second core portion and allow the same to drop downwardly within said lower chamber out of reactive relation with said first core portion.

5. The core assembly of claim 4, said heat responsive member being formed of polystyrene having a higher loading density of $UO_2$ than said core.

6. The core assembly of claim 5, said core comprising polyethylene which has been pre-irradiated to about 3 megarep.

7. A core assembly for a low power reactor comprising a fluid tight cylindrical core tank having top and bottom removable end plates, a horizontally extending thin partition member disposed therein dividing said tank into upper and lower chambers, a solid form hydrogen moderated $UO_2$ core disposed in said tank, said core being cylindrical in form, having a first sub-critical mass portion disposed above said partition member and supported thereby in concentric relation to said tank, and having a second sub-critical mass portion disposed beneath said partition member in concentric relation to said tank, graphite reflector means disposed above said partition member and supported thereby in enclosing relation with said first core portion, a substantially cylindrical graphite reflector member disposed within said lower chamber, said reflector member having its upper end recessed to receive and laterally enclose said second core portion, holding means supported by said tank and disposed within said lower chamber operable to hold said reflector member in spaced relation above said bottom tank plate to dispose the upper end of said reflector member and said second core portion against said partition member, said holding means including a heat responsive member disposed within said core operable in response to a predetermined increase in temperature of said core to release said reflector member and said second core portion and permit them to drop downwardly within said lower chamber, and an annular graphite reflector member fixedly disposed within said lower chamber outwardly of said cylindrical reflector member, and in contact therewith said cylindrical reflector being slidably fitted within said annular reflector member.

8. The core assembly of claim 7, said reflector members having their interjacent surfaces complementally tapered to prevent binding therebetween and promote downward movement of said cylindrical reflector member and said second core portion when said heat responsive member releases them.

9. The core assembly of claim 8, said heat responsive member being formed of polystyrene having a higher loading density of $UO_2$ than said core.

10. The core assembly of claim 9, said core comprising polyethylene which has been pre-irradiated to about 3 megarep.

11. A nuclear reactor core formed of the core material which comprises a solid cured intimate mixture of from about 2½% to about 7½% by weight of a fuel selected from the group consisting of the thermally fissionable transuranic elements, oxides, organic and inorganic salts thereof and mixtures thereof, and from about 92½% to about 97½% by weight of a solid hydrogenous organic binder material having a hydrogen density above about $5 \times 10^{22}$ hydrogen atoms/cc. and having thermal stability at a temperature of at least about 100° C., said core being formed of a plurality of adjacently disposed sections of varying thicknesses.

12. A nuclear reactor core according to claim 11 wherein the particle size of said fuel is from about 10 to about 30 microns.

13. A core assembly for a nuclear reactor including a core comprised of discrete particles of fissionable material substantially homogeneously dispersed within a hydrogenous moderator which is a solid at normal operating temperatures of said reactor, said core consisting of at least two core sections, each section being of sub-critical mass, means enclosing said sections and normally maintaining them together in reaction relation including means permitting relative movement between said sections to dispose them in non-reaction relation to each other, and means responsive to a higher than normal temperature condition encountered in a reactor excursion to cause such relative movement between said sections.

14. The core assembly according to claim 13 wherein said responsive means includes a material which is a solid at normal operating temperatures of said reactor but which fuses at a temperature at the low side of the range of temperatures encountered during a reactor excursion, said material being impregnated with fissionable material to a loading density in excess of the loading density of fissionable material in said core sections.

References Cited in the file of this patent

UNITED STATES PATENTS

| 1,594,491 | Bilstein | Aug. 3, 1926 |
| 2,462,241 | Wallhausen et al. | Feb. 22, 1949 |
| 2,780,596 | Anderson | Feb. 5, 1957 |
| 2,812,304 | Wheeler | Nov. 5, 1957 |

OTHER REFERENCES

Glasstone: "The Elements of Nuclear Reactor Theory," 1952, pp. 86–87, D. Van Nostrand Co., Inc.

Krasik et al.: "International Conference on the Peaceful Uses of Atomic Energy," Vol. 5, pp. 212–213, August 1955, United Nations Publication, New York.

TID–5275, Oct. 10, 1955, pp. 9–35.

ANCO 201 Nuclear Reactor Preliminary Design Study, Nov. 15, 1955, 52 pages, 4 plates and 1 page bibliography.

APEX–277, August 1956, 16 pages.